US012325335B2

United States Patent
Hasan et al.

(10) Patent No.: US 12,325,335 B2
(45) Date of Patent: Jun. 10, 2025

(54) SAFETY SEAT PROTECTING FROM SIDE IMPACT

(71) Applicant: BabyArk LTD, Hevel Modiln Industrial Park (IL)

(72) Inventors: Anan Hasan, Julis (IL); Shy Mindel, Hod-HaSharon (IL); Yury Antonov, Netanya (IL)

(73) Assignee: BabyArk LTD, Hevel Modiln Industrial Park (IL)

( * ) Notice: Subject to any disclaimer, the term of this patent is extended or adjusted under 35 U.S.C. 154(b) by 220 days.

(21) Appl. No.: 17/774,181

(22) PCT Filed: Nov. 4, 2020

(86) PCT No.: PCT/IL2020/051149
§ 371 (c)(1),
(2) Date: May 4, 2022

(87) PCT Pub. No.: WO2021/090318
PCT Pub. Date: May 14, 2021

(65) Prior Publication Data
US 2022/0371483 A1    Nov. 24, 2022

Related U.S. Application Data

(60) Provisional application No. 62/930,008, filed on Nov. 4, 2019.

(51) Int. Cl.
*B60N 2/28* (2006.01)
(52) U.S. Cl.
CPC ......... *B60N 2/2884* (2013.01); *B60N 2/2872* (2013.01)

(58) Field of Classification Search
CPC ........................... B60N 2/2872; B60N 2/2884
(Continued)

(56) References Cited

U.S. PATENT DOCUMENTS 4,512,604 A * 4/1985 Maeda ................. B60N 2/4235
296/68.1
D323,432 S    1/1992 Morton
(Continued)

FOREIGN PATENT DOCUMENTS

| CN | 1976830 | 6/2007 |
| CN | 101786431 | 7/2010 |

(Continued)

OTHER PUBLICATIONS

International Preliminary Report on Patentability Dated May 19, 2022 From the International Bureau of WIPO Re. Application No. PCT/IL2020/051142. (10 Pages).
(Continued)

*Primary Examiner* — Anthony D Barfield

(57) ABSTRACT

A safety seat for a vehicle includes a rigid frame concavely shaped to accommodate a person, and a headrest shaped to accommodate a head of the person. The headrest has two headrest side panels flexibly connected to the rigid frame. A horizontally disposed lever is positioned at the back of the rigid frame which is pushed by an external side impact. A vertically disposed lever adjacent to the horizontally disposed lever is pushed vertically by movement of the horizontally disposed lever, and moves the two headrest side panels to a closed position on the sides of the head.

15 Claims, 14 Drawing Sheets

(58) Field of Classification Search
USPC .................................................. 297/216.1
See application file for complete search history.

(56) References Cited

U.S. PATENT DOCUMENTS

| | | | |
|---|---|---|---|
| D339,477 S | 9/1993 | Kain | |
| D366,965 S | 2/1996 | Meeker et al. | |
| D373,028 S | 8/1996 | Kain | |
| D374,558 S | 10/1996 | Kain | |
| D383,912 S | 9/1997 | Meeker et al. | |
| 5,685,603 A | 11/1997 | Lane, Jr. | |
| 5,943,295 A | 8/1999 | Varga et al. | |
| 6,012,007 A | 1/2000 | Fortune et al. | |
| D419,786 S | 2/2000 | Kain | |
| 6,206,470 B1 | 3/2001 | Baloga et al. | |
| D450,935 S | 11/2001 | Dranschak et al. | |
| 6,393,348 B1 | 5/2002 | Ziegler et al. | |
| 6,609,054 B2 | 8/2003 | Wallace | |
| D484,941 S | 1/2004 | Johnson | |
| D487,640 S | 3/2004 | Chen | |
| 6,808,200 B2 | 10/2004 | Drobny et al. | |
| 6,922,147 B1 | 7/2005 | Viksins et al. | |
| 7,024,294 B2 | 4/2006 | Sullivan et al. | |
| D524,560 S | 7/2006 | Berhow et al. | |
| 7,288,009 B2 | 10/2007 | Lawrence et al. | |
| D572,027 S | 7/2008 | Hui | |
| 7,439,866 B2 | 10/2008 | Wallner et al. | |
| 7,523,679 B2 | 4/2009 | Hawes et al. | |
| D604,054 S | 11/2009 | Biaud | |
| D621,171 S | 8/2010 | Xu | |
| D629,218 S | 12/2010 | Li | |
| D629,219 S | 12/2010 | Xu et al. | |
| D629,220 S | 12/2010 | Xu et al. | |
| 8,366,146 B2 * | 2/2013 | Yamaki | 280/730.2 |
| D680,764 S | 4/2013 | Chen | |
| D683,974 S | 6/2013 | Leys et al. | |
| D697,323 S | 1/2014 | Williams et al. | |
| D702,052 S | 4/2014 | Wiegmann et al. | |
| 8,816,845 B2 | 8/2014 | Hoover et al. | |
| D737,061 S | 8/2015 | Daley et al. | |
| 9,132,754 B2 | 9/2015 | Mindel et al. | |
| D746,072 S | 12/2015 | Haley | |
| 9,266,535 B2 | 2/2016 | Schoenberg et al. | |
| D764,817 S | 8/2016 | Pos | |
| D771,987 S | 11/2016 | Daley et al. | |
| D778,627 S | 2/2017 | Stroikov | |
| D824,182 S | 7/2018 | Williams et al. | |
| 10,081,274 B2 | 9/2018 | Frank | |
| D841,346 S | 2/2019 | Huntley et al. | |
| D851,948 S | 6/2019 | Imrich | |
| D859,861 S | 9/2019 | Kapanzhi | |
| 10,723,245 B2 | 7/2020 | Anderson et al. | |
| 11,560,073 B2 * | 1/2023 | Pos | B60N 2/2872 |
| 11,964,623 B2 | 4/2024 | hasan | |
| 2002/0175544 A1 | 11/2002 | Goor et al. | |
| 2003/0155753 A1 | 8/2003 | Breed | |
| 2004/0113797 A1 | 6/2004 | Osborne | |
| 2005/0248136 A1 | 11/2005 | Breed et al. | |
| 2006/0273640 A1 | 12/2006 | Kassai et al. | |
| 2009/0152913 A1 * | 6/2009 | Amesar | 297/216.11 |
| 2010/0253498 A1 | 10/2010 | Rork | |
| 2012/0074758 A1 | 3/2012 | Gates | |
| 2013/0088057 A1 | 4/2013 | Szakelyhidi et al. | |
| 2014/0239684 A1 | 8/2014 | Mindel | |
| 2014/0253313 A1 | 9/2014 | Schoenberg | |
| 2014/0300155 A1 | 10/2014 | Lchman et al. | |
| 2014/0354021 A1 | 12/2014 | Sedlack | |
| 2017/0140634 A1 | 5/2017 | Mindel | |
| 2018/0099592 A1 | 4/2018 | Curry, V | |
| 2018/0232638 A1 | 8/2018 | Lin et al. | |
| 2018/0354443 A1 | 12/2018 | Ebrahimi et al. | |
| 2019/0176739 A1 | 6/2019 | Song | |
| 2019/0193590 A1 | 6/2019 | Labombarda et al. | |
| 2019/0251820 A1 | 8/2019 | Friedman | |
| 2021/0078461 A1 | 3/2021 | Ma et al. | |
| 2022/0363168 A1 | 11/2022 | Hasan et al. | |
| 2022/0402452 A1 | 12/2022 | Hasan et al. | |

FOREIGN PATENT DOCUMENTS

| | | |
|---|---|---|
| CN | 102015364 | 4/2011 |
| CN | 102189946 | 9/2011 |
| CN | 103042954 | 4/2013 |
| CN | 103879316 | 6/2014 |
| CN | 104024042 | 9/2014 |
| CN | 204327674 | 5/2015 |
| CN | 105620321 | 6/2016 |
| CN | 106627285 | 5/2017 |
| CN | 107662527 | 2/2018 |
| CN | 208498316 | 2/2019 |
| CN | 208576460 | 3/2019 |
| CN | 110116661 | 8/2019 |
| CN | 110126687 | 8/2019 |
| DE | 4446595 | 10/1995 |
| DE | 102008027829 | 12/2009 |
| DE | 102017126431 | 5/2019 |
| EP | 2269861 | 1/2011 |
| EP | 2746097 | 6/2014 |
| GB | 2490414 | 10/2012 |
| JP | 2009-274492 | 11/2009 |
| JP | 2010-284992 | 12/2010 |
| WO | WO 2013/046200 | 4/2013 |
| WO | WO 2017/029272 | 2/2017 |
| WO | WO-2017029272 A1 * | 2/2017 |
| WO | WO 2019/091916 | 5/2019 |
| WO | WO 2021/090313 | 5/2021 |
| WO | WO 2021/090315 | 5/2021 |
| WO | WO 2021/090316 | 5/2021 |
| WO | WO 2021/090318 | 5/2021 |
| WO | WO 2018/054249 | 8/2021 |

OTHER PUBLICATIONS

International Preliminary Report on Patentability Dated May 19, 2022 From the International Bureau of WIPO Re. Application No. PCT/IL2020/051146. (8 Pages).

International Preliminary Report on Patentability Dated May 19, 2022 From the International Bureau of WIPO Re. Application No. PCT/IL2020/051147. (10 Pages).

International Preliminary Report on Patentability Dated May 19, 2022 From the International Bureau of WIPO Re. Application No. PCT/IL2020/051149. (10 Pages).

International Search Report and the Written Opinion Dated Feb. 7, 2021 From the International Searching Authority Re. Application No. PCT/IL2020/051146. (10 Pages).

International Search Report and the Written Opinion Dated Apr. 12, 2021 From the International Searching Authority Re. Application No. PCT/IL2020/051142. (16 Pages).

International Search Report and the Written Opinion Dated Feb. 17, 2021 From the International Searching Authority Re. Application No. PCT/IL2020/051149. (17 Pages).

International Search Report and the Written Opinion Dated Mar. 25, 2021 From the International Searching Authority Re. Application No. PCT/IL2020/051147. (11 Pages).

Invitation to Pay Additional Fees and Communication Relating to the Results of the Partial International Search Dated Feb. 23, 2021 From the International Searching Authority Re. Application No. PCT/IL2020/051142. (4 Pages).

Notice of Allowability Dated Jul. 8, 2021 from the US Patent and Trademark Office Re. U.S. Appl. No. 29/713,766. (4 pages).

Notice of Allowance Dated Oct. 22, 2021 from the US Patent and Trademark Office Re. U.S. Appl. No. 29/712,626. (27 pages).

Notice of Allowance Dated Apr. 23, 2021 from the US Patent and Trademark Office Re. U.S. Appl. No. 29/716,766. (19 pages).

Notification of Office Action Dated Jul. 6, 2020 From the China National Intellectual Property Administration Re. Application No. 201930604505.2. (1 Page).

Notification of Office Action Dated Apr. 13, 2020 From the China National Intellectual Property Administration Re. Application No. 201930604505.2. (2 Pages).

(56) References Cited

OTHER PUBLICATIONS

Office Action Dated Oct. 26, 2020 From the Israel Patent Office Re. Application No. 65010. (2 Pages).
Office Action Dated Oct. 29, 2020 From the Israel Patent Office Re. Application No. 65009. (2 Pages).
Technical Requirement Dated Sep. 7, 2020 From the Servico Publico Federal, Ministerio da Economia, Instituto Nacional da Propriedade Industrial do Brasil Re. Application No. BR302020002169-0 and Its Translation Into English. (16 Pages).
BeSafe "BeSafe iZi Modular i-Size Installation", BeSafe—Scandinavian Safety, Screen Capture From YouTube Video Clip, 1 P., Feb. 9, 2016.
BeSafe "iZi Modular™ i-Size—User Manual", BeSafe® Scandinavian Safety, UN Regulation No. R129, p. 1-98, May 18, 2017.
BeSafe "SIP+—Additional Side Impact Protection", BeSafe® Scandinavian Safety, p. 1-4, 2019.
BeSafe "Toddler Car Seat—iZi Modular i-Size Concept", BeSafe® Scandinavian Safety, Product Description, p. 1-7, 2019.
Britax "Britax Roemer BABY-SAFE i-SIZE Review", Pushchair Expert, Product Description, p. 1-10, Dec. 21, 2016.
Jollyroom "CYBEX Sirona M2 i-Size Instructionvideo", Screen Capture From YouTube Video Clip, 1 P., Mar. 23, 2017.
Maxi-Cosi "Maxi-Cosi—How to Install the AxissFix Car Seat in Your Car", Screen Capture From YouTube Video Clip, 1 P., Dec. 12, 2014.
Maxi-Cosi "The New Pebble Plus", Screen Capture From YouTube Video Clip, 1 P., Oct. 10, 2014.
Smyths Toys Superstore "Smyth Toys—Doona ISOfix Base Black", Screen Capture From YouTube Video Clip, 1 P., Apr. 14, 2017.
Machine Translation Dated Feb. 22, 2024 of Notification of Office Action and Search Report Dated Feb. 8, 2024 From the National Intellectual Property Administration of the People's Republic of China Re. Application No. 202080091578.6. (10 Pages).
Notification of Office Action and Search Report Dated Feb. 8, 2024 From the National Intellectual Property Administration of the People's Republic of China Re. Application No. 202080091578.6. (9 Pages).
English Summary Dated Feb. 27, 2024 of Notification of Office Action Dated Feb. 8, 2024 From the National Intellectual Property Administration of the People's Republic of China Re. Application No. 202080091578.6. (2 Pages).
Supplementary Partial European Search Report and the European Provisional Opinion Dated Dec. 5, 2023 From the European Patent Office Re. Application No. 20885873.8. (12 Pages).
Notification of Office Action and Search Report Dated Jan. 22, 2024 From the State Intellectual Property Office of the People's Republic of China Re. Application No. 202080091573.3 and its Machine Translation of Office Action Into English as well as an English summary. ( 17 Pages).
Restriction Official Action Dated Jan. 25, 2024 from the US Patent and Trademark Office Re. U.S. Appl. No. 17/774,172. (6 pages).
Notice of Allowance Dated Nov. 20, 2023 from the US Patent and Trademark Office Re. U.S. Appl. No. 17/774,153. (3 pages).
Official Action Dated Nov. 16, 2023 from the US Patent and Trademark Office Re. U.S. Appl. No. 17/774,176. (27 pages).
Supplementary European Search Report and the European Search Opinion Dated Nov. 17, 2023 From the European Patent Office Re. Application No. 20885648.4. (7 Pages).
Official Action Dated Jun. 1, 2023 from the US Patent and Trademark Office Re. U.S. Appl. No. 17/774,153. (22 pages).
Supplementary European Search Report and the European Search Opinion Dated Nov. 15, 2023 From the European Patent Office Re. Application No. 20885576.7. (10 Pages).
Notification of Office Action and Search Report Dated Feb. 27, 2024 From the State Intellectual Property Office of the People's Republic of China Re. Application No. 202080091585.6 and its Machine Translation Into English. (27 Pages).
Supplementary European Search Report and the European Search Opinion Dated Dec. 13, 2023 From the European Patent Office Re. Application No. 20884278.1. (8 Pages).
Notification of Office Action Dated Oct. 14, 2024 From the State Intellectual Property Office of the People's Republic of China Re. Application No. 202080091578.6 and its Machine Translation together with an Engluish Summary. (17 Pages).
Official Action Dated Oct. 17, 2024 from the US Patent and Trademark Office Rc. U.S. Appl. No. 18/610,311. (26 pages).
Official Action Dated Aug. 29, 2024 from the US Patent and Trademark Office Re. U.S. Appl. No. 17/774,172. (44 pages).
Translation and Summary Dated Jul. 29, 2024 of Notification of Office Action Dated Jul. 16, 2024 From the State Intellectual Property Office of the People's Republic of China Re. Application No. 202080091585.6. (4 Pages).
Supplementary European Search Report and the European Search Opinion Dated May 15, 2024 From the European Patent Office Re. Application No. 20885873.8. (13 Pages).
Notification of Office Action Dated Jul. 16, 2024 From the State Intellectual Property Office of the People's Republic of China Re. Application No. 202080091585.6. (4 Pages).
Notice of Allowance Dated Jun. 21, 2024 from the US Patent and Trademark Office Re. U.S. Appl. No. 17/774,176. (29 pages).

* cited by examiner

SAFETY SEAT PROTECTING FROM SIDE IMPACT

RELATED APPLICATIONS

This Application is a National Phase of PCT Patent Application No. PCT/IL2020/051149 having International filing date of Nov. 4, 2020, which claims the benefit of priority under 35 USC § 119 (e) of U.S. Provisional Patent Application No. 62/930,008, filed on Nov. 4, 2019. The contents of the above applications are all incorporated by reference as if fully set forth herein in their entirety.

FIELD AND BACKGROUND OF THE INVENTION

The present invention, in some embodiments thereof, relates to a safety seat for a vehicle and, more particularly, but not exclusively, to a mechanism for absorbing energy of a side impact and/or closing a headrest to hold the head.

Most existing safety seats and safety mechanisms for vehicles are mainly protecting against front and back impact, for example headrests, seatbelts or airbags. However, a side impact to the vehicle, for example by another vehicle crossing an intersection may be just as harmful to the passengers as a front or back impact. The need for a side impact protection is relatively new and for example has only recently been required in the updated European regulation for children whereas the American regulation has no reference to it.

SUMMARY OF THE INVENTION

According to some embodiments of the present invention, there is provided a safety seat for a vehicle. The safety seat comprises a rigid frame concavely shaped to accommodate a person, and a headrest shaped to accommodate a head of the person. The headrest has two headrest side panels flexibly connected to the rigid frame. A horizontally disposed lever is positioned at the back of the rigid frame which is pushed by an external side impact. A vertically disposed lever adjacent to the horizontally disposed lever is pushed vertically by movement of the horizontally disposed lever, and moves the two headrest side panels to a closed position on the sides of the head.

Optionally, the safety seat further comprises two separating levers, each connecting between an upper end of the vertically disposed lever and a back side of one of the two headrest side panels, so the vertical movement of the vertically disposed lever moves the two separating levers to push outwards the back side of each of the two headrest side panels, thus moving inwards the front side of each of the two headrest side panels to a closed position on the sides of the head.

Optionally, the horizontally disposed lever is pushed at least substantially laterally by the external side impact.

Optionally, the horizontally disposed lever has a top groove; the vertically disposed lever has a bottom edge which is inserted in the top groove of the horizontally disposed lever and when the horizontally disposed lever is moved laterally, a surface of the bottom edge slides over a surface of the top groove, thus pushing the vertically disposed lever upwards.

Optionally, the horizontally disposed lever has a pointy edge, the vertically disposed lever has at least one side groove adjacent to the pointy edge, and when the horizontally disposed lever is moved laterally, the pointy edge is engaged inside the side groove and pushes the vertically disposed lever to move vertically.

Optionally, the safety seat further comprises a locking mechanism which holds the headrest side panels in the closed position.

Optionally, the horizontally disposed lever includes a shock absorbing mechanism which absorbs energy of an external side impact.

More optionally, the shock absorbing mechanism includes a deformable element which is deformed when the horizontally disposed lever is moved by an external side impact.

More optionally, the deformable element is selected from a group consisting of: an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating tube or strap or cable absorber, a tube flaring, a housed coiled cable absorber, a bar-through-die absorber, a hydraulic absorber and a pneumatic absorber.

More optionally, the deformable element includes a tube having a wide part accommodating a pushing rod, and a narrow part which is widened by the pushing rod when the pushing rod is pushed inside the narrow part.

More optionally, the shock absorbing mechanism includes at least one safety tooth, which breaks when the horizontally disposed lever is pushed by an external side impact and the vertically disposed lever is fully pushed.

Optionally, the horizontally disposed lever includes at least one arm extending laterally from at least one side of the rigid frame.

More optionally, the at least one arm is folded when the safety seat side is not installed next to a door of a vehicle.

More optionally, the at least one arm includes an extending element which is in a contracted state when the safety seat is not installed in a vehicle and is in an extended state when the safety seat is installed in a vehicle.

More optionally, the extending element includes a tube part and a rod part, and the rod part is inserted into the tube part when the safety seat is not installed in a vehicle and at least partly extracted from the tube part when the safety seat is installed in a vehicle.

More optionally, the at least one arm includes a latch preventing the extending element from sliding into the contracted state when the safety seat is installed in a vehicle.

Optionally, an outer end of one arm of the at least one arm is positioned next to an inner side of a door of the vehicle.

Optionally, the rigid frame is installed on a base. The base includes a horizontal tubular cavity located at a bottom back thereof; a horizontal bar positioned inside the horizontal tubular cavity, so that the base slides laterally on the horizontal bar as a result of an external side impact, at least two connecting latches on each end of the horizontal bar for attaching to an anchor of the vehicle; and a shock absorbing mechanism connecting between the horizontal tubular cavity and the horizontal bar which absorbs energy of the external side impact.

Optionally, the rigid frame is installed on a base. The base includes at least one horizontal bar located at a bottom back thereof; at least two connecting latches on each end of the at least one horizontal bar for attaching to an anchor of the vehicle; and at least two deformable elements connecting between the at least one horizontal bar and the at least two connecting latches, which absorb energy of an external side impact by deformation.

According to some embodiments of the present invention, there is provided a method for closing headrest side panels of a safety seat for a vehicle. The method comprises moving, by an external side impact, a horizontally disposed lever positioned at the back of a rigid frame concavely shaped to accommodate a person, pushing vertically, by movement of the horizontally disposed lever, a vertically disposed lever adjacent to the horizontally disposed lever, and moving two headrest side panels flexibly connected to the rigid frame to a closed position on the sides of the head, by movement of the vertically disposed lever.

According to some embodiments of the present invention, there is provided a safety seat for a vehicle. The safety seat comprises a rigid frame concavely shaped to accommodate a person, a headrest shaped to accommodate a head of the person, the headrest having a headrest base connected to the rigid frame and two headrest side panels flexibly connected to the headrest base, an impact detector which is configured to detect an impact to the vehicle, and a closing mechanism which is triggered to move the headrest side panels inwards to a closed position on the sides of the head when the impact detector detects an impact to the vehicle.

Optionally, the impact detector includes a weight that is moved by the impact.

Optionally, the impact detector includes an acceleration sensor.

Optionally, the impact detector includes a chemical reaction in an explosion chamber which is triggered by a mechanical impact to the explosion chamber.

Optionally, the closing mechanism includes two separating levers, each pushing outwards a back side of one of the two headrest side panels, thus moving inwards the front side of each of the two headrest side panels to a closed position on the sides of the head.

More optionally, the closing mechanism includes a motor which moves the two separating levers.

Optionally, the closing mechanism includes springs which are released to pull outwards a back side of each of the two headrest side panels, thus moving inwards the front side of each of the two headrest side panels to a closed position on the sides of the head.

According to some embodiments of the present invention, there is provided a safety seat for a vehicle. The safety seat, comprises a rigid frame concavely shaped to accommodate a person, at least one arm extending laterally from at least one side of the rigid frame, and a deformable element connecting between the at least one arm and the rigid frame which is deformed when the at least one arm is pushed by an external side impact, thus absorbing energy of the external side impact.

Optionally, the safety seat further comprises a headrest shaped to accommodate a head of the person, the headrest having a headrest base connected to the rigid frame and two headrest side panels flexibly connected to the headrest back panel and a closing mechanism which is triggered by the at least one arm to move the headrest side panels inwards to a closed position on the sides of the head when the at least one arm is pushed by an external side impact.

According to some embodiments of the present invention, there is provided a safety seat for a vehicle. The safety seat comprises a rigid frame concavely shaped to accommodate a person, a horizontal tubular cavity located at the bottom back of the rigid frame, a horizontal bar positioned inside the horizontal tubular cavity, so that the rigid frame slides laterally on the horizontal bar as a result of an external side impact, at least two connecting latches on each end of the horizontal bar for attaching to an anchor of the vehicle, and a shock absorbing mechanism connecting between the horizontal tubular cavity and the horizontal bar which absorbs energy of the external side impact.

Optionally, the shock absorbing mechanism includes a large surface area of the horizontal bar which touches the surface of the horizontal tubular cavity to create high friction between the horizontal bar and the horizontal tubular cavity.

Optionally, the shock absorbing mechanism includes a deformable element connecting between the horizontal bar and the horizontal tubular cavity which is deformed when the rigid frame is pushed by an external side impact, thus absorbing energy of the external side impact.

According to some embodiments of the present invention, there is provided a safety seat for a vehicle. The safety seat comprises a rigid frame concavely shaped to accommodate a person, at least one horizontal bar located at the bottom back of the rigid frame, at least two connecting latches on each end of the at least one horizontal bar for attaching to an anchor of the vehicle, and at least two deformable elements connecting between the at least one horizontal bar and the at least two connecting latches, which absorbs energy of the external side impact by deformation.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1:
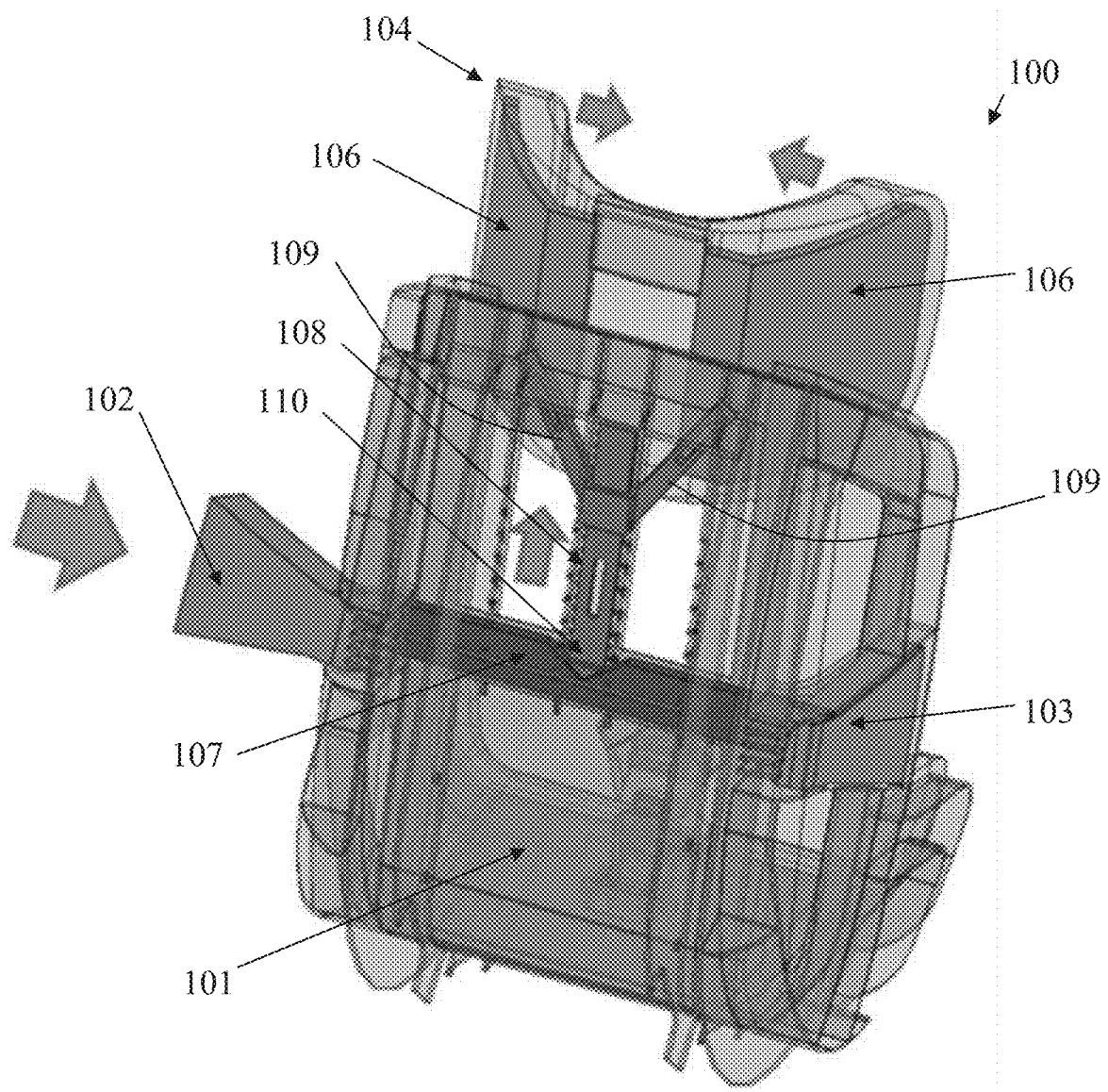
FIG. 1 is a schematic illustration of an infant safety seat for a vehicle, according to some embodiments of the present invention.

The present invention, in some embodiments thereof, relates to a safety seat for a vehicle and, more particularly, but not exclusively, to a mechanism for absorbing energy of a side impact and/or closing a headrest to hold the head.

According to some embodiments of the present invention, there is provided a safety seat, for example for an infant or child, but could also be for an adult person. The safety seat includes a rigid frame, a mechanism for absorbing energy of a side impact and a headrest with flaps for side protection of the head. The seat may also include a mechanism for closing the headrest side panels to protect the passenger's head, in response to a side impact. Such mechanism, when implemented, limits the head's motion and reduces the momentum, forces and/or speed in which the head may be moved. Closing the headrest side panels may be done by a mechanism that transfers some of the side impact energy to engage the headrest panels, as described below.

The safety seat may include side arm(s) which receive the impact energy from the vehicle's door, and transfers it to a horizontally disposed lever that is positioned at the back or side of the rigid frame, which is moved by the impact energy. The energy may be transferred, for example, by means of linear motion, a 4 bar mechanism and/or other methods to transfer kinetic movement. A shock absorbing mechanism, for example a deformable element as described below, absorbs the impact energy and prevents at least some of it from reaching the rigid frame and the passenger. The shock absorbing mechanism may be located, for example, between the arm and the horizontally disposed lever, or may be part of the horizontally disposed lever.

Optionally, a vertically disposed lever is adjacent to the horizontally disposed lever. The vertically disposed lever is pushed vertically upwards or downwards by movement of the horizontally disposed lever, thereby causing movement of the two headrest side panels to a closed position on the sides of the head. The two headrest side panels may also be closed by other mechanisms in response to the side impact, as described below. The movement of the vertically disposed lever may also engage a locking mechanism for the headrest side panels to maintain the headrest side panels in the closed position.

Optionally, a bottom shock absorbing mechanism between the rigid frame and the latches attaching the safety seat to the vehicle, further absorbs impact energy. For example, the rigid frame may slide on a horizontal bar connecting the latches (for example linear, 4-bar, or other mechanism), with high friction absorbing some of the energy.

The protection against side impact may be described in stages of energy flow: absorbing energy by the shock absorbing mechanism of the horizontally disposed lever, energy flowing around the passenger's body in the structure of the rigid body, rigidness of the headrest prevents breaking and/or deformation, closing the headrest side panels to hold the passenger's head and optionally reduces the shear forces, and absorbing residual energy, for example by a bottom shock absorbing mechanism.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Referring now to the drawings, FIG. 1 is a schematic illustration of an infant safety seat for a vehicle, according to some embodiments of the present invention.

The safety seat 100 includes a rigid frame 101, which is concavely shaped to accommodate an infant. Other embodiments may include a rigid frame which is shaped to accommodate a child or an adult. The rigid frame 101, may be made of a rigid material, for example plastic, steel, aluminum, carbon fibers, glass fibers and/or other materials that are designed to withstand strong forces, so it does not break or suffers plastic deformation on impact. The structure protects the infant and diverts the forces around it. The rigid frame 101 may be installed on a safety seat base (not shown) having a separate shock absorbing mechanism for absorbing energy of an external side impact to the safety seat base, such embodiments of the safety seat bases described in connection with FIGS. 9A-12B. The safety seat base may also include any other shock absorbing mechanism that is known or that may become known.

Figure 2A:
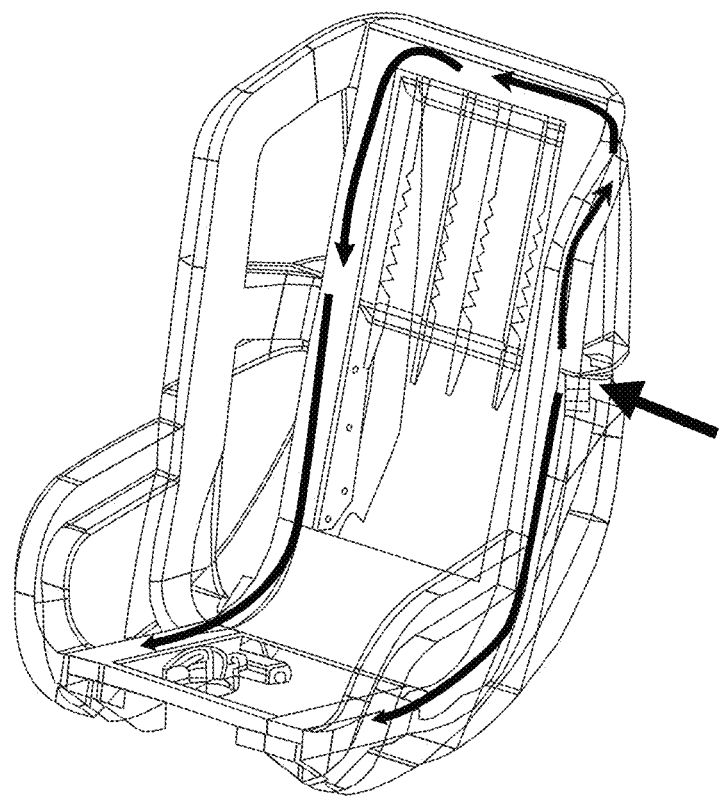
FIG. 2A is a schematic illustration showing an exemplary rigid frame and the forces that are transferred on impact, according to some embodiments of the present invention.
Figure 2B:
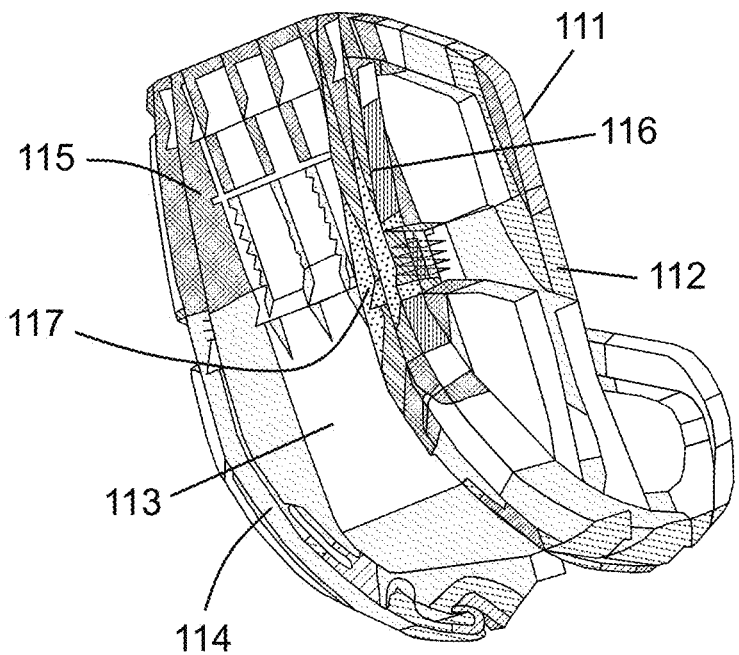
FIG. 2B is a schematic illustration showing simulated deformation of the exemplary rigid frame of FIG. 2A, according to some embodiments of the present invention.

FIG. 2A shows an exemplary rigid frame and the forces that are transferred on impact, represented by the horizontal arrow, according to some embodiments of the present invention. FIG. 2B shows simulated deformation of the exemplary rigid frame of FIG. 2A, according to some embodiments of the present invention. The deformation is indicated for seven exemplary regions 111-117, ranging from near zero deformation at region 111 to maximum deformation at region 117. A maximum of 12 millimeters deformation is measured at region 117.

The safety seat 100 may also include at least one arm extending laterally from at least one side of the rigid frame 101. Optionally, the safety seat 100 includes two arms 102 and 103, each extending laterally from one side of the rigid frame 101. The arms 102 and 103 may be connected to the rigid frame 101 by a hinge. When the safety seat 100 is not installed in a vehicle (in storage), or when the safety seat 100 is not installed next to a door of the vehicle, the arms 102 and 103 are folded, for example by a hinge. When the safety seat 100 is installed next to a door of the vehicle, an outer end of one arm 102 is positioned to face an inner side of the door. In this case, the arm 103, which is not facing the door, is folded. This means that when the safety seat 100 is installed next to a door, the arm 102 should be opened and reaching out closer to the door. In case of a car colliding on the side door adjacent to the safety seat 100, the arm 102 prevents the safety seat 100 from tilting towards the door and creating high force of the infant's head, and also tunnels the impact energy to the rigid frame 101 and away from the infant's body, as described below.

Optionally, the arms 102 and 103 include a shock absorbing mechanism which absorbs energy of an external side impact, as described below. The shock absorbing mechanism may include, for example, a deformable element connecting between the arm 102 and the rigid frame 101 which is plastically deformed when the arm 102 is pushed by an external side impact, thus absorbing energy of the external side impact. In case of a side impact collision where a car or an object is colliding with the side door adjacent to the safety seat 100, the shock absorbing mechanism absorbs some of the impact energy, for example by plastic deformation, thus further protecting the infant.

The safety seat 100 also includes a headrest 104 shaped to accommodate a head of the person. The headrest 104 has a structure which is designed to withstand strong forces. The headrest 104 may be made of a rigid material, for example plastic, steel, aluminum, glass fibers and/or carbon fibers. This means that headrest 104 does not move and/or deform significantly, or at all, during impact, and prevent the head from moving (side movement and rotational movement) as a result of side impact. This is unlike a flexible headrest that does not prevent significant movement and twist of the head, thus increasing the risk of injury.

Figure 3:
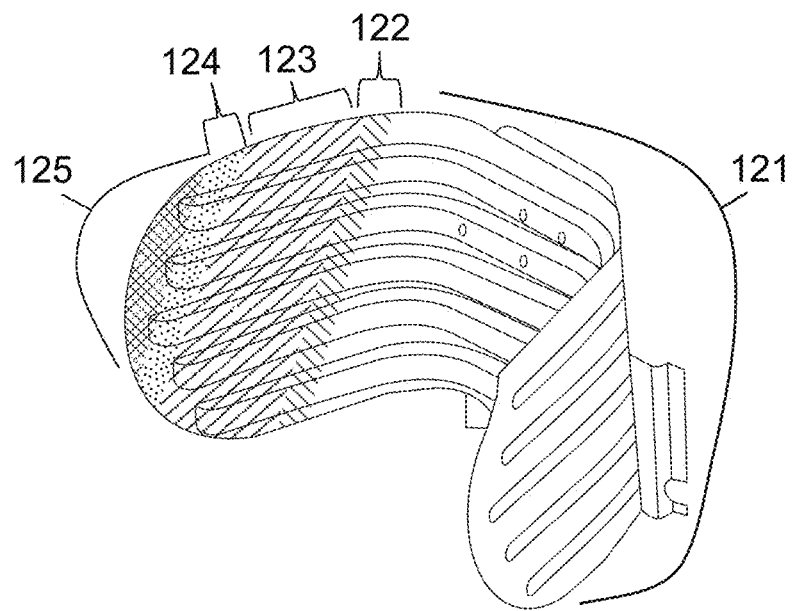
FIG. 3 is a schematic illustration showing an exemplary rigid headrest, and the minimal deformation that occurs when load is applied on the headrest, according to some embodiments of the present invention.

FIG. 3 shows an exemplary rigid headrest, and the minimal deformation that occurs when load is applied on the headrest, according to some embodiments of the present invention. The deformation is indicated for five exemplary regions 121-125, ranging from near zero deformation at region 121 to maximum deformation at region 125. The vast majority of the headrest falls within region 121 and experiences near zero deformation, and only a small sliver of the headrest is within region 125.

Figure 4:
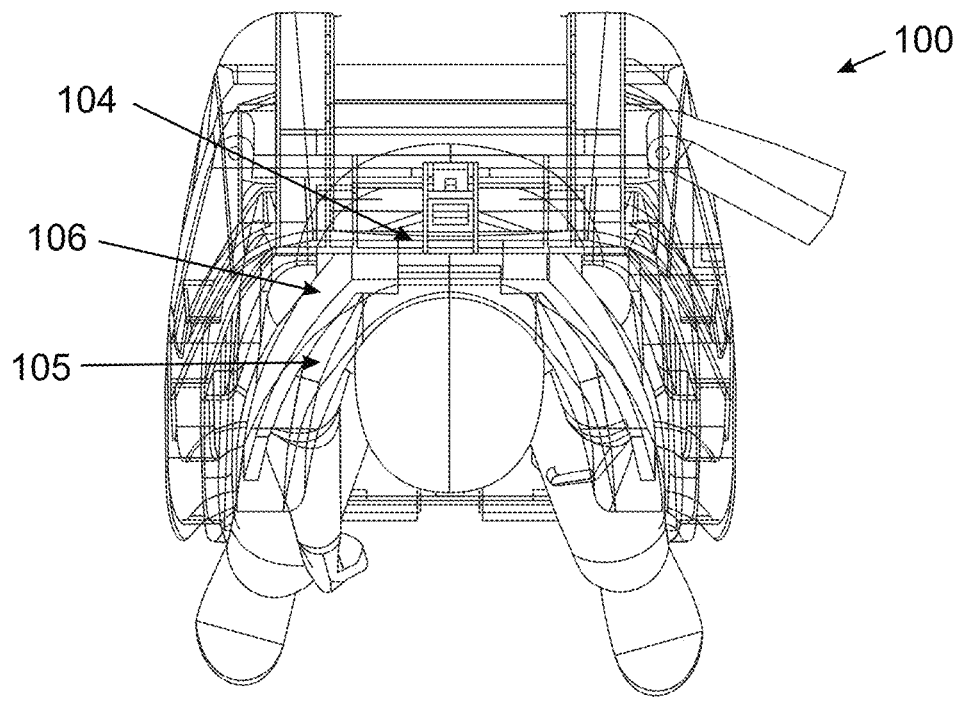
FIG. 4 is a top view of the infant safety seat for a vehicle of FIG. 1, according to some embodiments of the present invention.

Reference is now made to FIG. 4, which is a top view of the infant safety seat for a vehicle of FIG. 1, according to some embodiments of the present invention.

Optionally, the headrest 104 includes soft layer 105 such as foam, covering the inner surface of the headrest 104. This material may absorb some of the impact energy and decrease the accelerations transferred to the head. This may be done, for example, using compressing material such as polyurethane foam, deforming material such as Styrofoam and/or a combination thereof for example by layering different materials.

Optionally, the headrest 104 includes two headrest side panels 106, flexibly connected to the rigid frame 101, as shown at FIG. 1. The orientation of the headrest side panels 106 may be changed relative to the rigid frame 101. This means that the headrest side panels 106 have an open position, in which the headrest side panels 106 are further apart and far from the infant's head, and a closed position in which the headrest side panels 106 the front parts of the two headrest side panels 106 are closer to each other and to the sides of the infant's head. In this closed position, the headrest side panels 106 protect the infant's head and prevent it from being thrust by a side impact. Reducing the movement of the head in a side impact accident may reduce internal injury to the brain.

The headrest side panels 106 are moved to the closed position in response to a side impact to the safety seat 100. This may be done by any kind of mechanism. Optionally, this is done by a mechanism that transfers some of the side impact energy to close the headrest side panels 103.

Optionally, the headrest 104 includes a horizontally disposed lever 107 positioned at the back of the rigid frame 101, which is pushed by an external side impact, optionally pushed at least substantially laterally.

Optionally, the headrest 104 also includes a vertically disposed lever 108, adjacent to the horizontally disposed lever 107, which is pushed vertically (upwards or downwards) by movement of the horizontally disposed lever 107.

Optionally, this is done by a top groove of the horizontally disposed lever 107 pushing a bottom edge of the vertically disposed lever 108. This may be done by a recess with a gradual slope on both sides and respective gradual slopes on the tip of lever 108. For example, a triangular groove 109, and a bottom triangular edge 110 which is inserted in the top triangular groove 109. When the horizontally disposed lever 107 is moved laterally, a surface of the bottom triangular edge 110 slides over a surface of the top triangular groove 109, thus pushing the vertically disposed lever 108 upwards. This may also be done, for example, by moving the vertically disposed lever 108, or twisting it in a spiral movement. Any mechanism for transferring horizontal movement to vertical movement may be used, for example a cam shaft, another angled lever, slider and/or a pin releasing the lever against a spring.

The vertically disposed lever 108 moves the two headrest side panels to a closed position on the sides of the head.

Optionally, this is done by two separating levers 109, each connecting between an upper end of the vertically disposed lever 108 and a back side of one of the two headrest side panels 106, so the upward movement of the vertically disposed lever 106 moves the two separating levers 109 to push outwards the back side of each of the two headrest side panels 106, thus moving inwards the front side of each of the two headrest side panels 106 to a closed position on the sides of the head.

Optionally, vertically disposed lever 108 may have multiple grooves to engage with the horizontally disposed lever 107 and/or with the two separating levers 109 when the headrest 104 height is adjusted to different heights of infants.

Optionally and alternatively, closing the two headrest side panels 106 in response to a side impact may be done in any other way, directly or indirectly, for example mechanically or electronically. Optionally, the safety seat 100 includes an impact detector which is detecting an impact to the vehicle, and a closing mechanism which is triggered to move the headrest side panels 106 inwards to a closed position when the impact detector is detecting an impact to the vehicle.

The impact detector may include, for example, a weight that is moved by the impact, an acceleration sensor, a chemical reaction in an explosion chamber which is triggered by a mechanical impact to the explosion chamber and/or any other detection mechanism.

The closing mechanism may include, for example, springs which are released to pull outwards a back side of each of the two headrest side panels 106, a motor which moves the two separating levers, and/or any other closing mechanism.

Optionally, when the two headrest side panels 106 are in a closed position, a locking mechanism holds the headrest side panels 106 in the closed position. The locking mechanism may include, for example, any pin, tooth, ratchet mechanism and/or any one-directional mechanism. The movement of the vertically disposed lever 108 may engage the locking mechanism, for example through operation of a spring.

Reference is now made to FIGS. 5A, 5B, 5C and 5D, which are schematic illustrations of top views of an infant safety seat for a vehicle, according to some embodiments of the present invention. The mechanism in this example combines the closing of the headrest side panels and the shock absorbing, operating one after the other.

Figure 6:
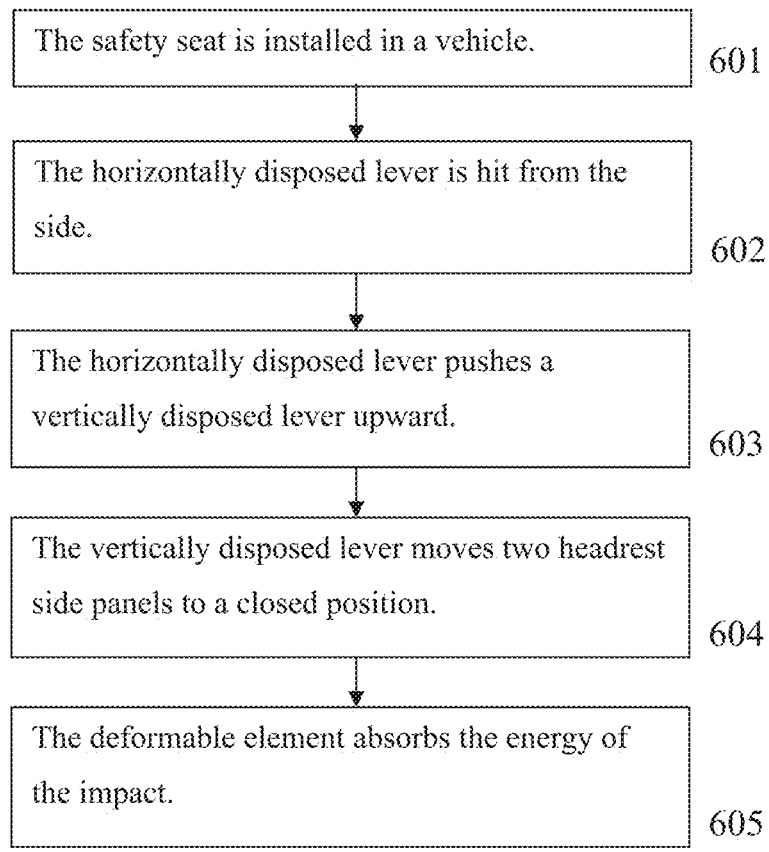
FIG. 6 is a flowchart schematically representing a method for closing headrest side panels and absorbing side impact energy, according to some embodiments of the present invention.

Reference is also made to FIG. 6, which is a flowchart schematically representing a method for closing headrest side panels and absorbing side impact energy, according to some embodiments of the present invention.

Figure 5A:
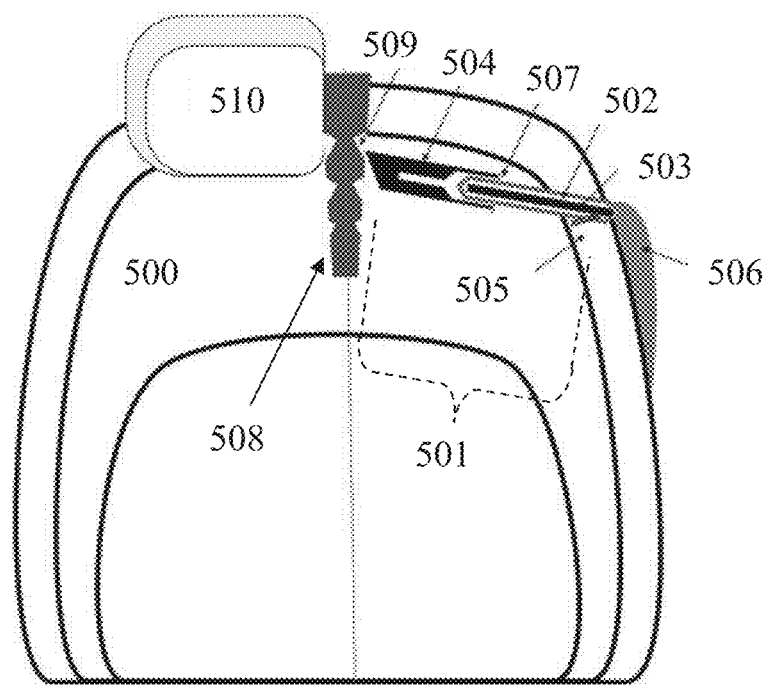
FIGS. 5A, 5B, 5C and 5D are schematic illustrations of top views of an infant safety seat for a vehicle, according to some embodiments of the present invention.

First, as shown at FIG. 5A, the safety seat is not installed in a vehicle. A horizontally disposed lever 501 includes an arm which may be extended laterally from one side of the rigid frame 500. The arm is folded when the safety seat is not installed in a vehicle. For example, the arm includes an extending element, which is in a contracted state when the safety seat is not installed in a vehicle and is in an extended state when the safety seat is installed in a vehicle. The extending element may be touching the door of the car and is the first element of the seat that receives the impact energy. The extending element may include, for example, a tube 502 and a rod 503, the rod 503 is inserted into the tube 502 when the safety seat is not installed in a vehicle. Alternatively, the extending element may include any telescoping, sliding and/or guiding mechanism.

The horizontally disposed lever 501 also includes a shock absorbing mechanism which absorbs energy of an external side impact. Optionally, the shock absorbing mechanism includes a deformable element 504 which is deformed when the at least one arm is moved by an external side impact. The shock absorbing mechanism could also be based on other methods, such as compression of a material such as gas, or high friction. The shock absorbing mechanism may include a plastically deformable absorbing element such as an elongated spiral, a crushable column, a rolling torus, an inversion tube, a cutting shock absorber, a slitting shock absorber, a tube-and-die absorber, a rolling absorber, a flattening-tube absorber, a strap bender absorber, a rod bender absorber, a wire bender absorber, a wire-through-platen absorber, a deformable link absorber, an elongating a tube/strap/cable absorber, a tube flaring, a housed coiled cable absorber, a bar-through-die absorber, a hydraulic absorber, a pneumatic absorber and/or any combinations thereof.

Optionally, the deformable element 504 includes a tube having a wide part accommodating a pushing rod (in this example, the pushing rod is tube 502 of the arm), and a narrow part which is widened by the pushing rod when the pushing rod is pushed inside the narrow part. The deformable element may also include, for example, a tube filled with a material of plastic characteristics, a tube filled with ribs that break by the pushing rod, and/or any other material which is deformed by force.

Figure 5B:
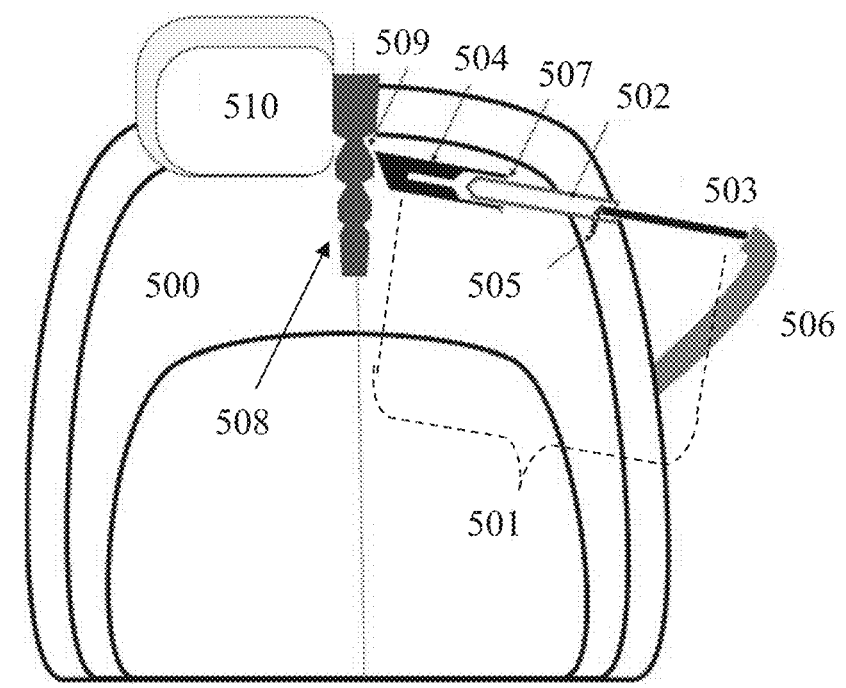

Then, as shown at FIG. 5B and step 601 of FIG. 6, the safety seat is installed in a vehicle. The rod 503 of the arm is at least partly extracted from the tube 502 when the safety seat is installed in a vehicle. Optionally, the arm includes a latch 505, which is preventing the rod part from sliding into the tube part when the safety seat is installed in a vehicle. The rod part cannot slide back into the tube part unless the latch 505 is opened. In this state, an outer end of the arm is positioned next to an inner side of a door of the vehicle.

Optionally, the outer end of the arm is connected to an arm cover 506, which is also attached is attached to the rigid frame 500 and open when the safety seat is installed in the vehicle.

Figure 5C:
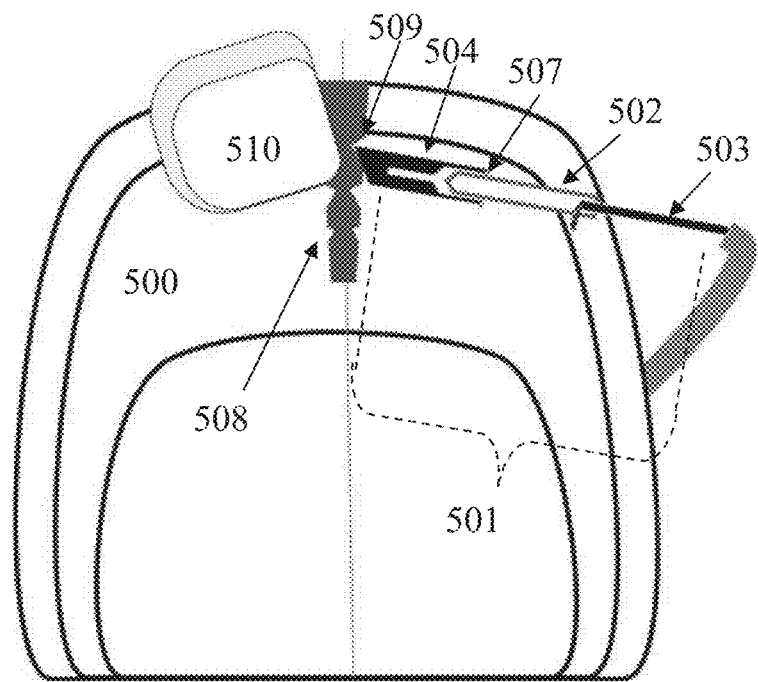

Then, as shown at FIG. 5C and step 602 of FIG. 6, the horizontally disposed lever 501 is hit from the side. The rod 503 of the arm is impacted by the door of the vehicle, and pushes the tube 502 of the arm. Tube 502 is held by safety teeth 507 (at least one safety tooth) that are preventing it from being further inserted into the deformable element 504. Therefore, the tube 502 pushes the deformable element 504 via the safety teeth 507.

Then, as shown at FIG. 5C and step 603 of FIG. 6, the horizontally disposed lever 501 pushes a vertically disposed lever 508 upward. Optionally, the horizontally disposed lever 501 has a pointy edge, and the vertically disposed lever 508 has at least one side groove 509, adjacent to the pointy edge of the horizontally disposed lever 501. When the horizontally disposed lever 501 is moved laterally, the pointy edge is engaged inside the side groove 509 and pushes the vertically disposed lever 508 to move upwards or downwards. The vertically disposed lever 508 may include multiple teeth, so it may be adjusted to different heights of infants.

Then, as shown at FIG. 5C and step 604 of FIG. 6, the vertically disposed lever 508 moves two headrest side panels 510 to a closed position on the sides of the head. Optionally, a locking mechanism may hold the headrest side panels 510 in the closed position. The movement of the vertically disposed lever 508 engages side panel locks of the headrest side panels 510, for example through operation of a spring.

Figure 5D:
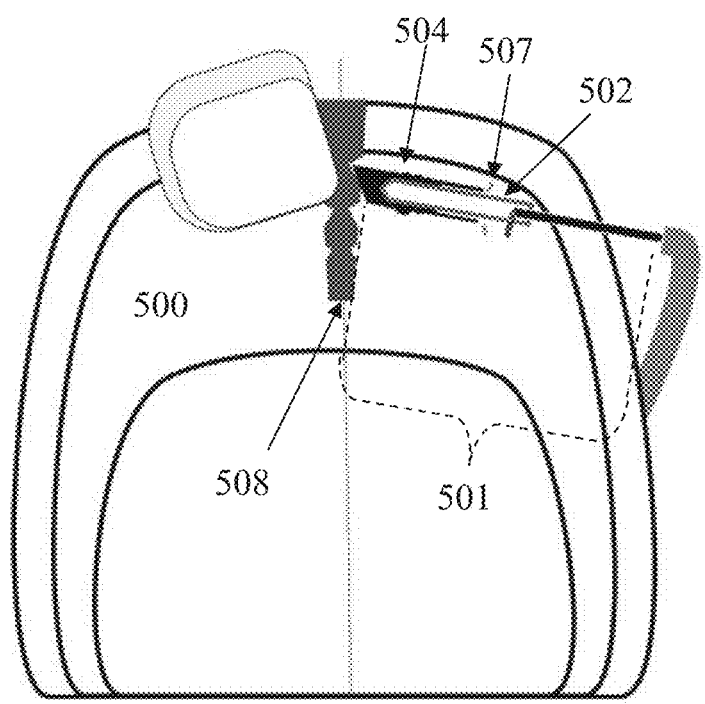

Then, as shown at FIG. 5D and step 605 of FIG. 6, the deformable element 504 absorbs the energy of the impact. When vertically disposed lever 508 is fully pushed upward or downward and the two headrest side panels 510 are in the closed position, the safety teeth 507 break by the force of the impact. The safety teeth 507 control the amount of energy (or movement), from the impact, which is used for closing the headrest side panels 510. Thus, the teeth 507 help in controlling the sequence of operation—first the vertically disposed lever 508 is pushed, then the teeth 507 break to start the energy absorption by the deformable element 504. This is adjusted so the vertically disposed lever 508 does not break by the force. Then, when the tube 502 is released from safety teeth 507, the tube 502 is pushed into the deformable element 504 by the rest of the impact energy. The narrow part of deformable element 504 is widened by the tube part 502 when the tube 502 is pushed inside the narrow part.

Figure 7A:
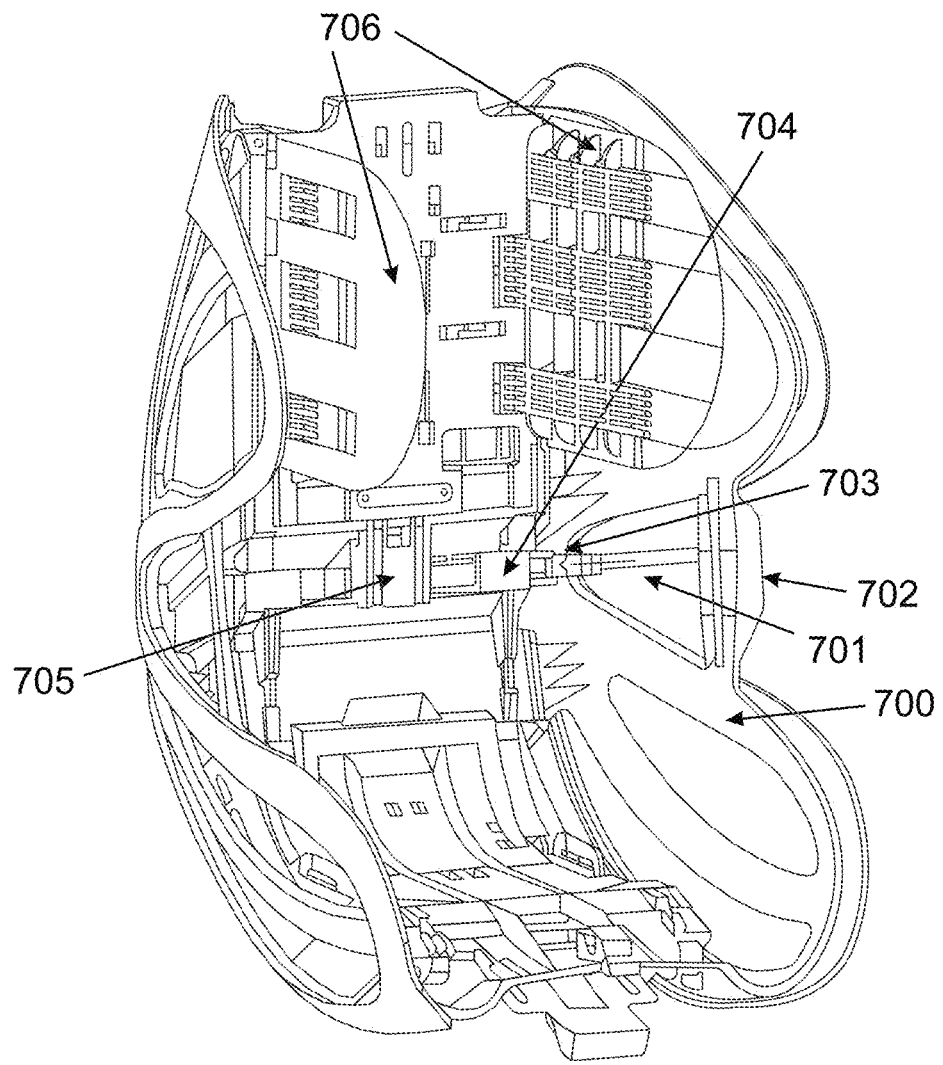
FIGS. 7A and 7B are illustrations of an exemplary infant safety seat for a vehicle, according to some embodiments of the present invention.
Figure 7B:
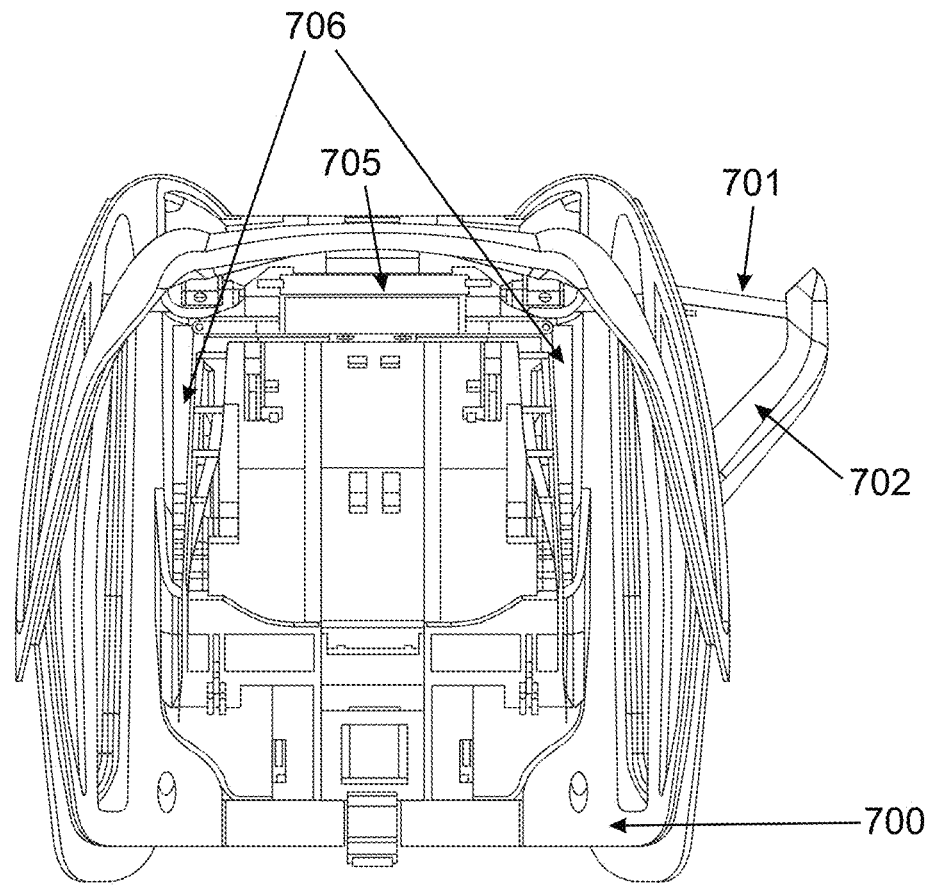

Reference is now made to FIGS. 7A and 7B, which are illustrations of an exemplary infant safety seat for a vehicle, according to some embodiments of the present invention. The figures show a rigid frame 700, an arm 701 and an arm cover 702, a deformable element 703, a horizontally disposed lever 704, a vertically disposed lever 705 and headrest side panels 706.

Figure 8A:
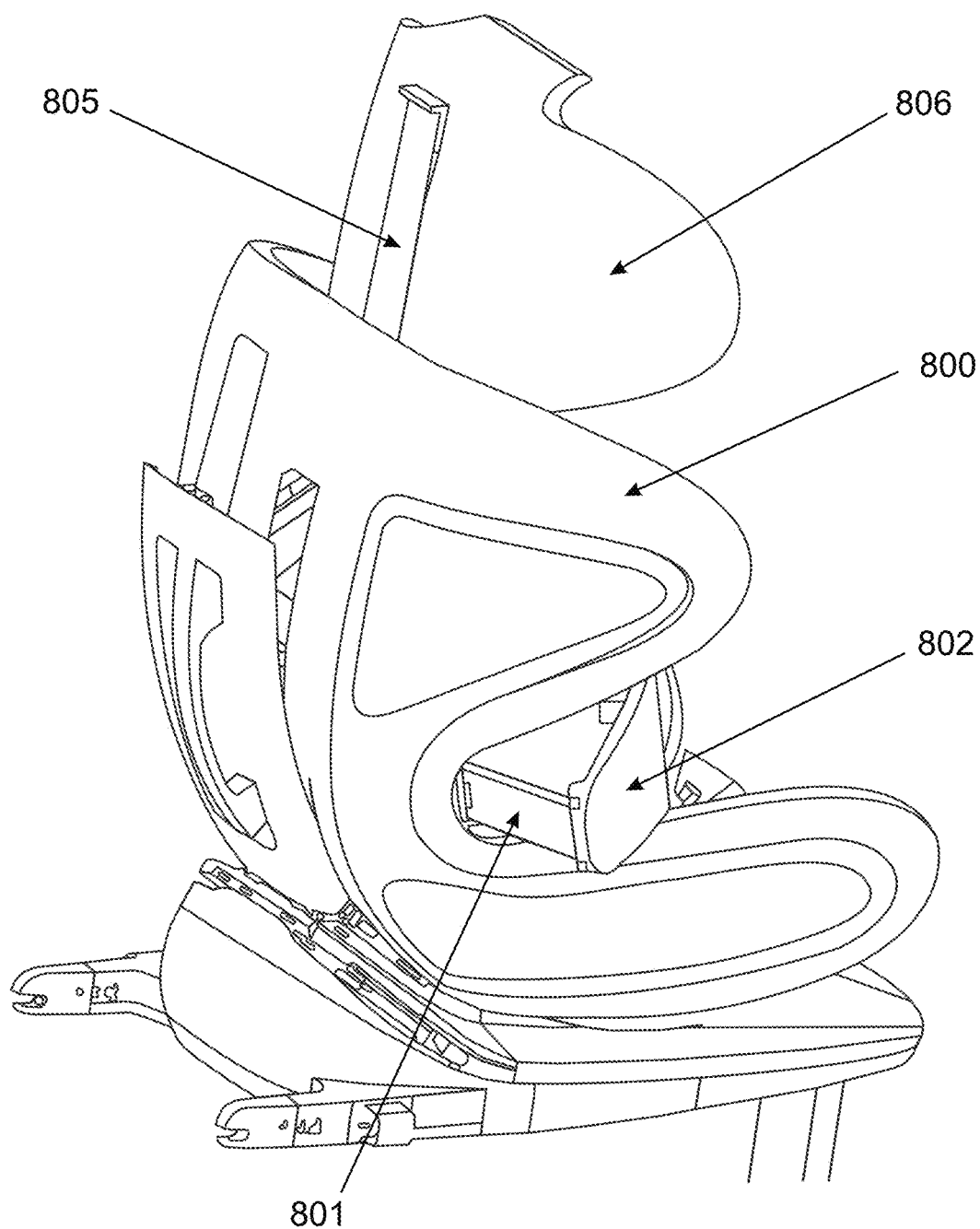
FIGS. 8A and 8B are side and cross section illustrations, respectively, of another exemplary infant safety seat for a vehicle, according to some embodiments of the present invention.
Figure 8B:
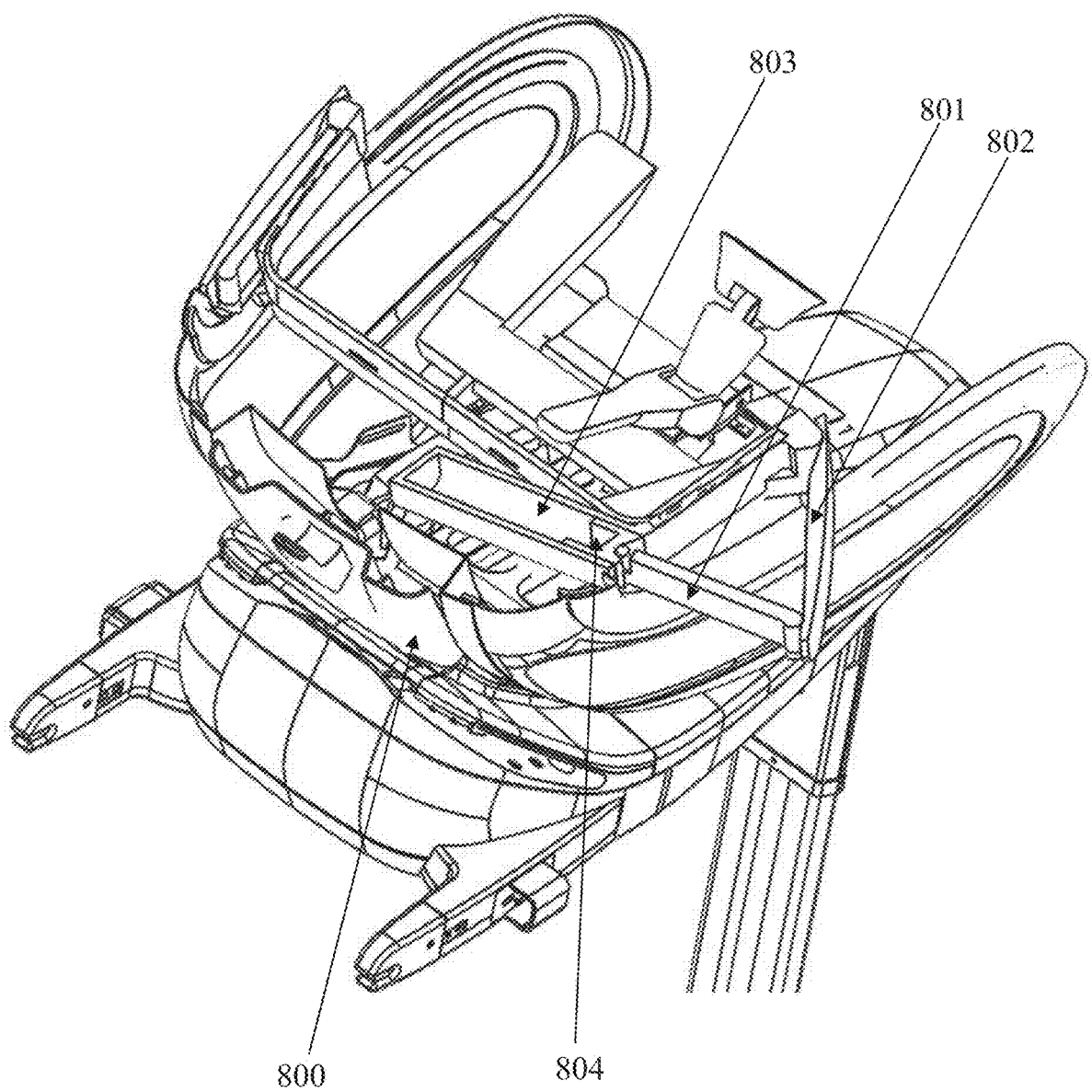

Reference is now made to FIGS. 8A and 8B, which are side view and cross section illustrations, respectively, of another exemplary infant safety seat for a vehicle, according to some embodiments of the present invention. The figures show a rigid frame 800, an arm 801 and an arm cover 802, a tube 803 which includes a deformable element (not shown), a piston 804, a vertically disposed lever 805 and headrest side panels 806. The mechanism operates in a similar way to the mechanism described above.

Figure 9A:
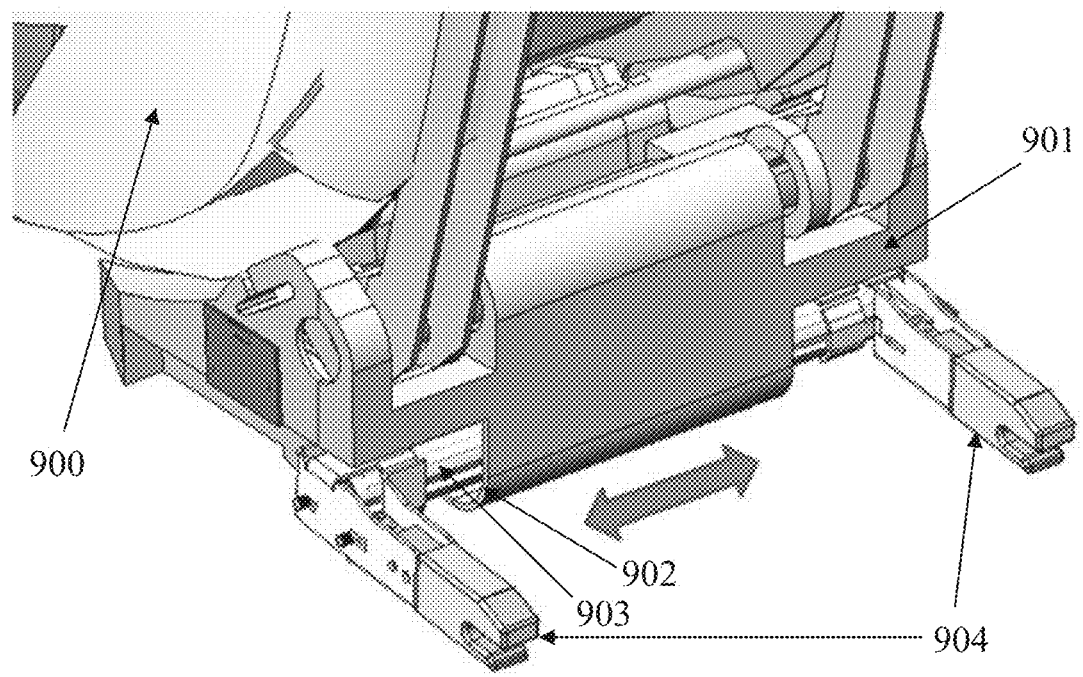
FIG. 9A is a schematic illustration of a safety seat for a vehicle with a bottom shock absorbing mechanism, according to some embodiments of the present invention
Figure 9B:
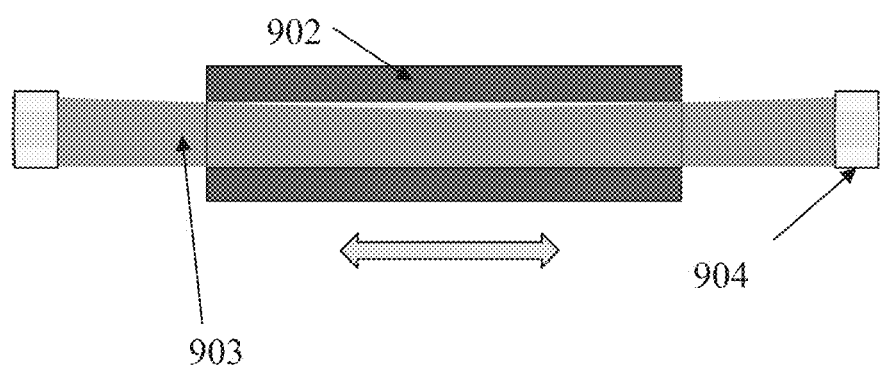
FIG. 9B is a schematic illustration of the bottom shock absorbing mechanism shown in FIG. 9A, according to some embodiments of the present invention.

Reference is now made to FIG. 9A, which is a schematic illustrations of a safety seat for a vehicle with a bottom shock absorbing mechanism, according to some embodiments of the present invention. Reference is also made to FIG. 9B, which is a schematic illustration of the bottom shock absorbing mechanism shown in FIG. 9A, according to some embodiments of the present invention.

The rigid frame 900 is optionally attached to a base 901, which includes horizontal tubular cavity 902 located at the bottom back of the rigid frame. A horizontal bar 903 is positioned inside the horizontal tubular cavity 902. The rigid frame may slide laterally (with the base 901) on the horizontal bar 903 as a result of an external side impact. At least two connecting latches 904 are located on each end of the horizontal bar. The connecting latches 904 are used for attaching to an anchor of the vehicle. These may be, for example Isofix standard latches. A shock absorbing mechanism connects between the horizontal tubular cavity 902 and the horizontal bar 903. The shock absorbing mechanism absorbs energy of the external side impact and prevents the energy from being fully transferred to the rigid frame 900.

Optionally, the shock absorbing mechanism includes a large surface area of the horizontal bar 903 which is touching the surface of the horizontal tubular cavity 902 to create high friction between the horizontal bar and the horizontal tubular cavity.

Optionally, the shock absorbing mechanism includes a deformable element connecting between the horizontal bar 903 and the horizontal tubular cavity 902 which is deformed when the rigid frame is pushed by an external side impact, thus absorbing energy of the external side impact.

Optionally, the shock absorbing mechanism includes a deformable element connecting between one or more horizontal bars and the connecting latches.

Figure 10A:
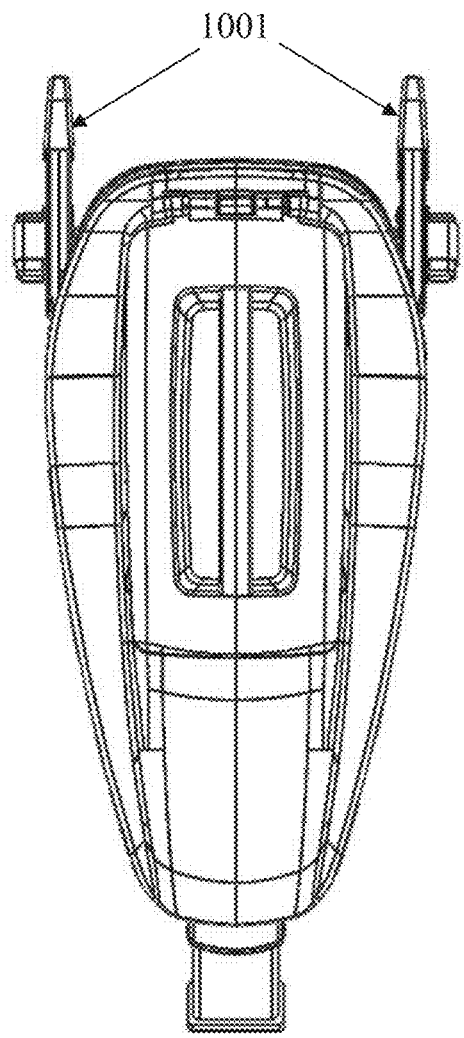
FIGS. 10A and 10B are top view illustrations of a safety seat base for a vehicle with a bottom shock absorbing mechanism, before and after side impact, respectively, according to some embodiments of the present invention.
Figure 10B:
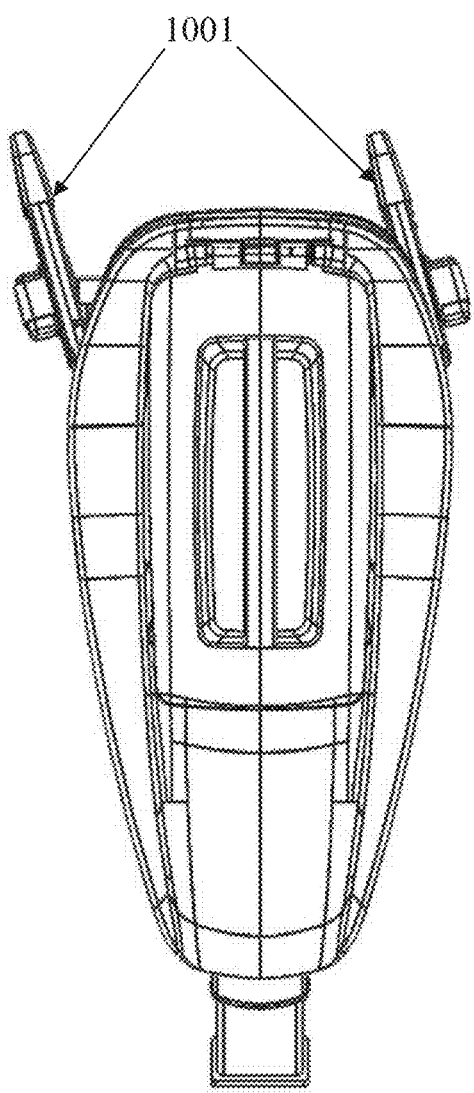
Figure 11A:
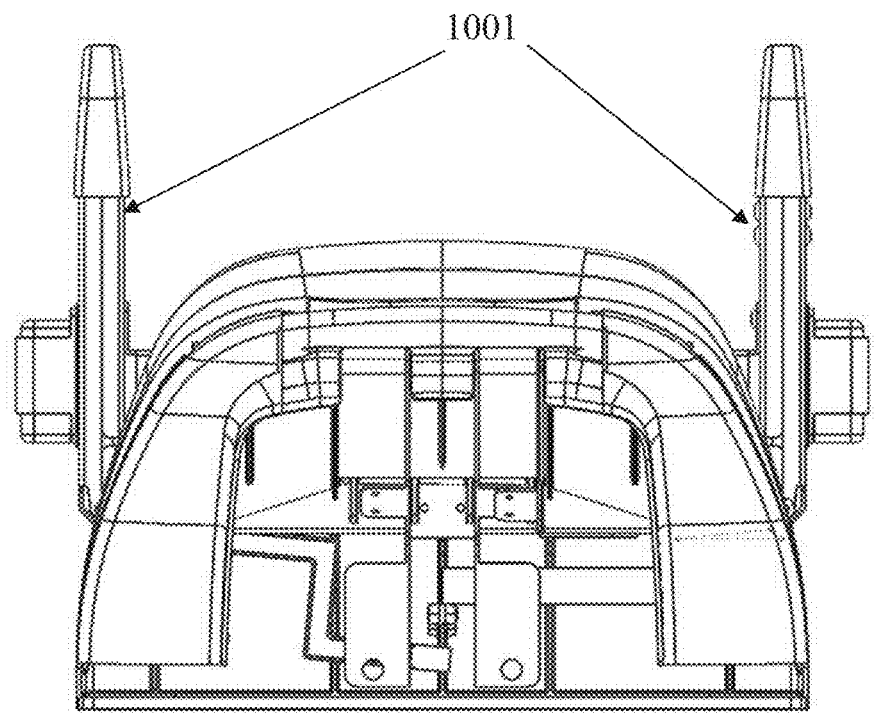
FIGS. 11A and 11B are illustrations of a back part of the safety seat base of FIGS. 10A and 10B, respectively, according to some embodiments of the present invention.
Figure 11B:
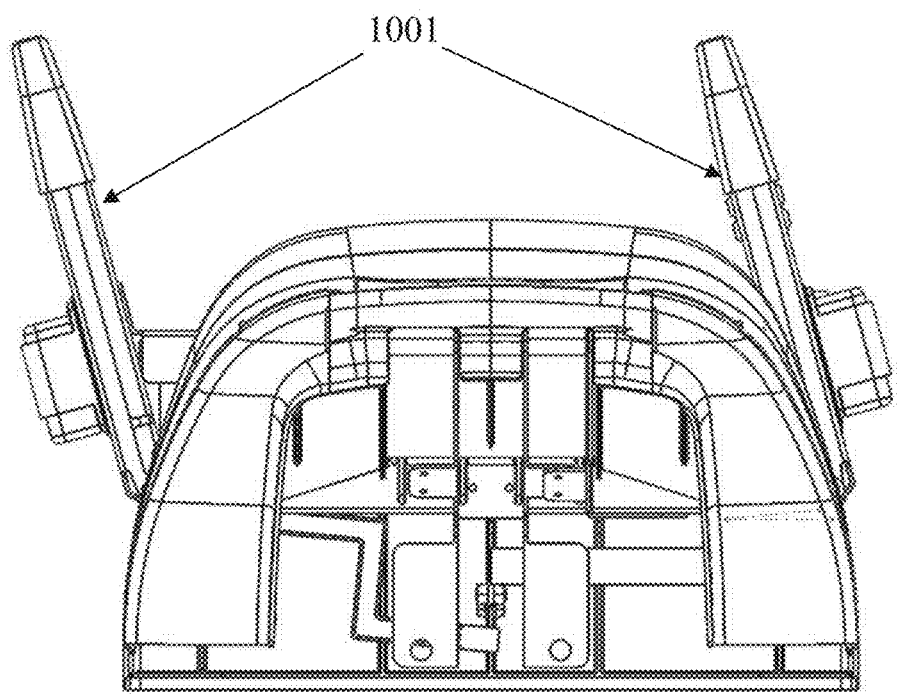
Figure 12A:
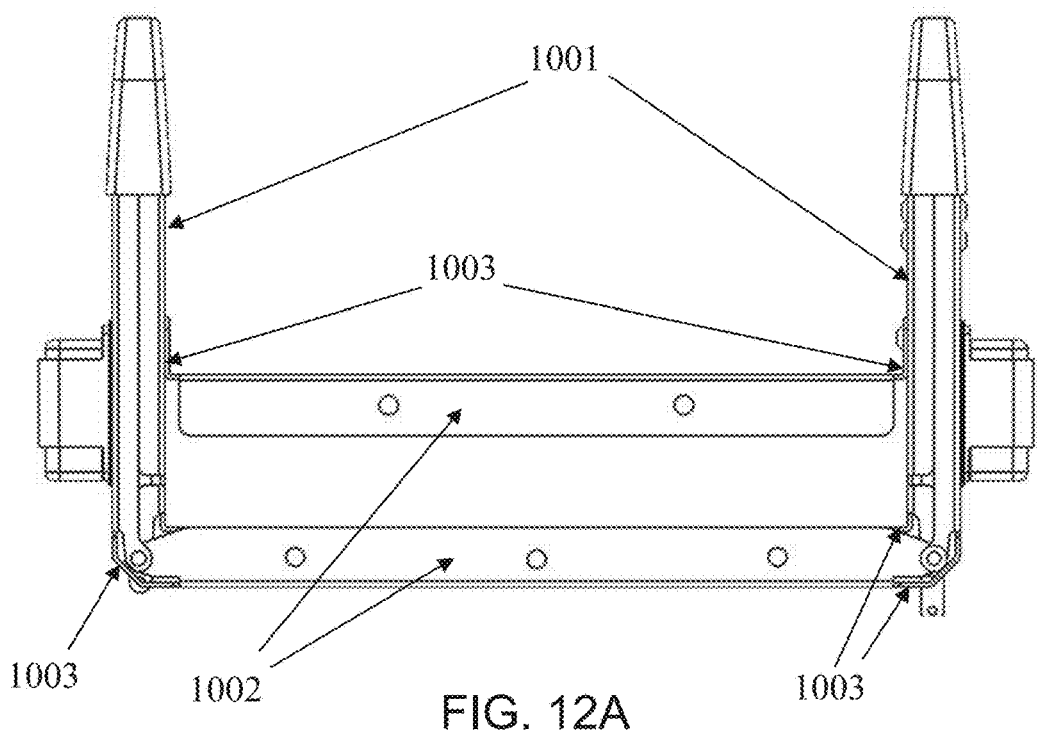
FIGS. 12A and 12B are illustrations of the bottom shock absorbing mechanism of the safety seat base of FIGS. 10A and 10B, respectively, according to some embodiments of the present invention.
Figure 12B:
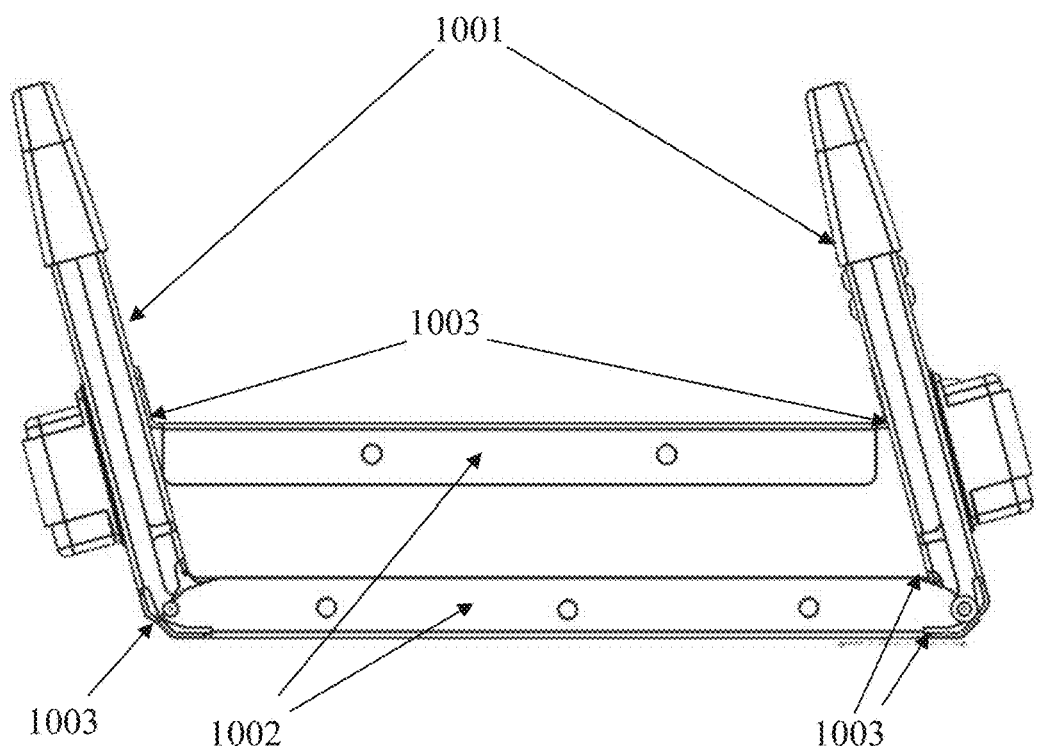

Reference is now made to FIGS. 10A and 10B, which are top view illustrations of a safety seat base for a vehicle with a bottom shock absorbing mechanism, before and after side impact, respectively, according to some embodiments of the present invention. Reference is also made to FIGS. 11A and 11B, which are illustrations of a back part of the safety seat base of FIGS. 10A and 10B, respectively, according to some embodiments of the present invention. Reference is also made to FIGS. 12A and 12B, which are illustrations of the bottom shock absorbing mechanism of the safety seat base of FIGS. 10A and 10B, respectively, according to some embodiments of the present invention.

At least two connecting latches 1001, such as Isofix standard latches, are used for attaching the seat base to an anchor of the vehicle. One or more horizontal bars 1002 are positioned between the connecting latches 1001. The horizontal bars 1002 are connected to the connecting latches 1001 by deformable elements 1003. During a side impact, the deformable elements 1003 are absorbing energy, by deforming. This prevents full movement of the seat base, and of a seat body attached to the seat base, from fully moving with the ends of the connecting latches 1001 that are attached to the vehicle.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant safety seats will be developed and the scope of the term safety seat is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting. In addition, any priority document(s) of this application is/are hereby incorporated herein by reference in its/their entirety.

What is claimed is:

1. A safety seat for a vehicle, comprising:
a rigid frame concavely shaped to accommodate a person; and
a horizontally disposed lever positioned at the back of the rigid frame which is pushed by an external side impact;
wherein the horizontally disposed lever includes a shock absorbing mechanism which absorbs energy of an external side impact;
wherein the shock absorbing mechanism includes a deformable element which is deformed when the horizontally disposed lever is moved by an external side impact;
a headrest shaped to accommodate a head of the person, the headrest having two headrest side panels flexibly connected to the rigid frame; and
two separating levers, each connecting between an upper end of a vertically disposed lever and a back side of one of the two headrest side panels, so the vertical movement of the vertically disposed lever moves the two separating levers to push outwards the back side of each of the two headrest side panels, thus moving inwards the front side of each of the two headrest side panels to a closed position on the sides of the head.

2. The safety seat of claim 1, wherein the horizontally disposed lever is pushed at least substantially laterally by the external side impact.

3. The safety seat of claim 1, wherein:
the horizontally disposed lever comprises a pointy edge;
the vertically disposed lever comprises at least one side groove adjacent to the pointy edge; and
when the horizontally disposed lever is moved laterally, the pointy edge is engaged inside the side groove and pushes the vertically disposed lever to move vertically.

4. The safety seat of claim 1, further comprising:
a locking mechanism which holds the headrest side panels in the closed position.

5. The safety seat of claim 1, wherein the deformable element includes a tube having a wide part accommodating a pushing rod, and a narrow part which is widened by the pushing rod when the pushing rod is pushed inside the narrow part.

6. The safety seat of claim 1, wherein the shock absorbing mechanism includes at least one safety tooth, which breaks when the horizontally disposed lever is pushed by an external side impact and the vertically disposed lever is fully pushed.

7. The safety seat of claim 1, wherein the horizontally disposed lever includes at least one arm extending laterally from at least one side of the rigid frame.

8. The safety seat of claim 7, wherein the at least one arm is folded when the safety seat side is not installed next to a door of a vehicle.

9. The safety seat of claim 8, wherein the at least one arm includes a latch preventing the extending element from sliding into the contracted state when the safety seat is installed in a vehicle.

10. The safety seat of claim 7, wherein the at least one arm includes an extending element which is in a contracted state when the safety seat is not installed in a vehicle and is in an extended state when the safety seat is installed in a vehicle.

11. The safety seat of claim 10, wherein the extending element includes a tube part and a rod part, wherein the rod part is inserted into the tube part when the safety seat is not installed in a vehicle and at least partly extracted from the tube part when the safety seat is installed in a vehicle.

12. The safety seat of claim 7, wherein an outer end of one arm of the at least one arm is positioned next to an inner side of a door of the vehicle.

13. A safety seat for a vehicle, comprising:
a rigid frame concavely shaped to accommodate a person;
a horizontally disposed lever positioned at the back of the rigid frame which is pushed by an external side impact; and
a vertically disposed lever;
wherein the horizontally disposed lever includes a shock absorbing mechanism which absorbs energy of an external side impact;
wherein the shock absorbing mechanism includes a deformable element which is deformed when the horizontally disposed lever is moved by an external side impact;
wherein:
the horizontally disposed lever comprises a top groove;
the vertically disposed lever comprises a bottom edge which is inserted in the top groove of the horizontally disposed lever; and
when the horizontally disposed lever is moved laterally, a surface of the bottom edge slides over a surface of the top groove, thus pushing the vertically disposed lever upwards.

14. A safety seat for a vehicle, comprising:
a rigid frame concavely shaped to accommodate a person; and
a horizontally disposed lever positioned at the back of the rigid frame which is pushed by an external side impact;
wherein the horizontally disposed lever includes a shock absorbing mechanism which absorbs energy of an external side impact;
wherein the shock absorbing mechanism includes a deformable element which is deformed when the horizontally disposed lever is moved by an external side impact;
wherein the rigid frame is made from a rigid material selected from a group consisting of: plastic, steel, aluminum, carbon fibers, and glass fibers, and is installed on a base, wherein the base comprises:
a horizontal tubular cavity located at a bottom back thereof;
a horizontal bar positioned inside the horizontal tubular cavity, so that the base slides laterally on the horizontal bar as a result of an external side impact;

at least two connecting latches on each end of the horizontal bar for attaching to an anchor of the vehicle; and a shock absorbing mechanism connecting between the horizontal tubular cavity and the horizontal bar which absorbs energy of the external side impact.

15. A safety seat for a vehicle, comprising:

a rigid frame concavely shaped to accommodate a person; and
- a horizontally disposed lever positioned at the back of the rigid frame which is pushed by an external side impact;

wherein the horizontally disposed lever includes a shock absorbing mechanism which absorbs energy of an external side impact;

wherein the shock absorbing mechanism includes a deformable element which is deformed when the horizontally disposed lever is moved by an external side impact;

wherein the rigid frame is made from a rigid material selected from a group consisting of: plastic, steel, aluminum, carbon fibers, and glass fibers, and is installed on a base, wherein the base comprises:

at least one horizontal bar located at a bottom back thereof;

at least two connecting latches on each end of the at least one horizontal bar for attaching to an anchor of the vehicle; and at least two deformable elements connecting between the at least one horizontal bar and the at least two connecting latches, which absorb energy of an external side impact by deformation.

\* \* \* \* \*